(12) United States Patent
Takeuchi

(10) Patent No.: US 7,420,721 B2
(45) Date of Patent: Sep. 2, 2008

(54) OSCILLATION SCAN MIRROR WITH MAGNETIC RETAINING FORCE ACTING BETWEEN THE HOLDER AND SHAFT TO PREVENT RELATIVE TILT BETWEEN SHAFT AND BEARINGS

(75) Inventor: Shinji Takeuchi, Kawaguchi (JP)

(73) Assignee: Optoelectronics Co., Ltd., Saitama Pref. (JP)

( * ) Notice: Subject to any disclaimer, the term of this patent is extended or adjusted under 35 U.S.C. 154(b) by 0 days.

(21) Appl. No.: 11/216,839

(22) Filed: Aug. 31, 2005

(65) Prior Publication Data

US 2007/0047047 A1  Mar. 1, 2007

(51) Int. Cl.
G02B 26/08 (2006.01)
G02B 5/00 (2006.01)
(52) U.S. Cl. ................... 359/199; 235/462.32
(58) Field of Classification Search ................. 359/197, 359/198, 199, 200; 235/462.2–462.22, 462.31–462.33
See application file for complete search history.

(56) References Cited

U.S. PATENT DOCUMENTS

| 5,381,438 | A |  | 1/1995 | Guo et al. |
| 5,693,929 | A | * | 12/1997 | Dvorkis et al. ............... 235/454 |
| 5,810,481 | A | * | 9/1998 | Nii et al. ...................... 384/279 |
| 6,491,225 | B1 | * | 12/2002 | Dvorkis et al. ......... 235/472.01 |
| 6,809,451 | B1 | * | 10/2004 | Brown ................... 310/156.08 |
| 2004/0026512 | A1 | * | 2/2004 | Otsubo ................... 235/462.37 |

FOREIGN PATENT DOCUMENTS

| JP | 55122470 A | * | 9/1980 |
| JP | 06-123851 A |  | 5/1994 |
| JP | 2001-308439 A |  | 11/2001 |
| WO | WO 03/019463 A |  | 3/2003 |

* cited by examiner

*Primary Examiner*—Alessandro Amari
*Assistant Examiner*—Jennifer L Doak
(74) *Attorney, Agent, or Firm*—Kaplan Gilman Gibson & Dernier LLP

(57) ABSTRACT

An improved oscillation scan mirror assembly comprises a shaft, a holder having a bearing with a bearing surface supporting the holder on the shaft, a scan mirror secured to the holder. The holder and therefore the mirror are oscillatable around the shaft under an oscillating driving force, and bearing and the shaft is prevented from being tilt from each other. Preferably, a lateral retaining force is provided to constantly keep the bearing and the shaft in an aligned contact with each other. Since the relative tilting between bearing and the shaft is prevented, the vertical wobble or vibration of bearing, and therefore of the holder and the mirror, relative to the shaft is therefore suppressed.

35 Claims, 3 Drawing Sheets

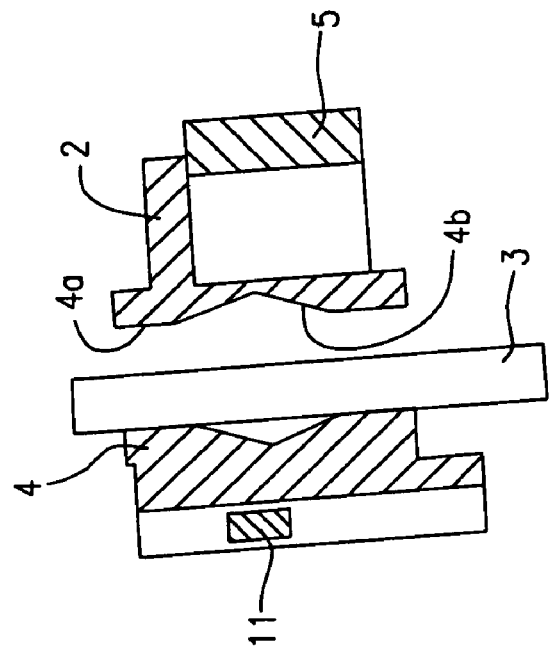
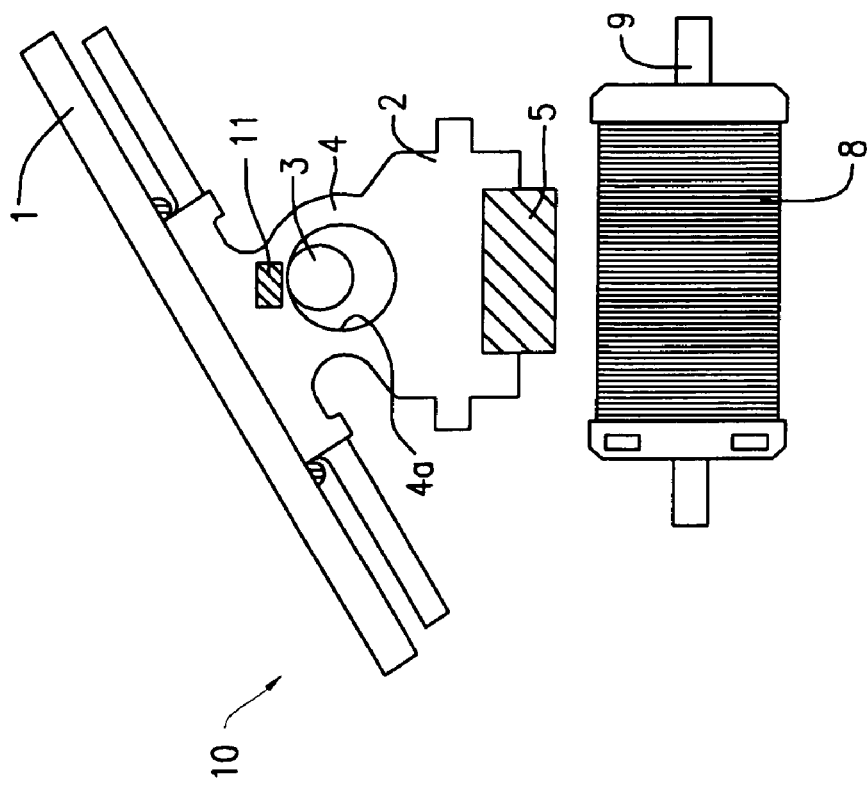
FIG. 3b
FIG. 3a

OSCILLATION SCAN MIRROR WITH MAGNETIC RETAINING FORCE ACTING BETWEEN THE HOLDER AND SHAFT TO PREVENT RELATIVE TILT BETWEEN SHAFT AND BEARINGS

BACKGROUND OF THE INVENTION

The present invention relates to symbol such as barcode reading techniques, and more particularly, to an improved oscillation scan mirror assembly in which the wobbling movement present in prior devices is suppressed and the accuracy of the scan increased. Additionally, the invention, in one embodiment, decreases friction between a shaft and bearing by using a material suited for this purpose.

In an existing oscillation scan mirror assembly 10 as illustrated in FIG. 1a, a scan mirror 1 is secured to a holder 2, which in turn is supported on a stationary shaft 3 through a bearing 4. The bearing 4 has a bearing surface 4a for supporting the holder 2 on the shaft 3, and a recessed portion 4b not in contact with the shaft 3 so as to lessen the friction between the shaft 3 and the bearing 4. An oscillating magnetic driving force is generated by an alternating current passing through a coil 6 wound on a yoke 7, which drives a magnet 5 embedded in the holder 2 to oscillate, thereby causing the holder 2 and the mirror 4 to oscillate around the stationary shaft 3 during a scanning operation.

To allow the holder 2 to oscillate around the shaft 3, there is provided a clearance between the shaft 3 and the bearing surface 4a of the bearing 4. As best seen in FIG. 1b, the existence of the clearance between the bearing surface 4a and the shaft 3 results a tilt of the bearing 4 relative to the stationary shaft 3. During the scanning operation, in addition to oscillating around the shaft 3 in a horizontal plane (i.e., a plane lateral or perpendicular to the axial direction of the shaft 3), the tilting bearing 4 also vibrates in vertical planes (i.e., planes substantially along the axial direction of the shaft 3). This is defined herein as wobbling. Though there may be some lateral magnetic force between the yoke 7 and the magnet 5, it is not large enough to constantly keep the shaft 3 and the bearing 4 in an aligned contact with each other. The undesirable vertical wobble or vibration of the bearing 4 relative to the shaft 3 may result in a tilt of the scanning ray and a double line effect in the laser beam trace, therefore lowering the precision of the scanning operation. The wobbling might also contribute to wearing out of the bearing 4, shaft 3 and other components, and therefore shorten the life of the assembly, although all the adverse affects of such wobbling are not fully known.

A conventional solution to alleviate the above problem of wear is to fill oil at the bearing surface 4a so as to suppress the wobbling movement. However, this could result in leaking and is thus suboptimal. There are no easily available solutions to the problem of wobbling known to the inventors hereof.

SUMMARY OF THE INVENTION

It is an object of the present invention to provide an improved oscillation scan mirror assembly in which the wobble or vibration is suppressed.

It is a further object to provide an improved oscillation scan mirror assembly in which the shaft and the bearing are prevented from tilting relative to each other.

It is another object to provide an improved oscillation scan mirror assembly in which the shaft and the bearing are constantly kept in aligned contact with each other.

It is a further object to provide an improved oscillation scan mirror assembly which has less wearing in components and has a longer life.

According to the present invention, an improved oscillation scan mirror assembly is provided, which comprises a shaft, a holder having a bearing with a bearing surface supporting the holder on the shaft, a scan mirror secured to the holder, a first means for preventing the shaft and the bearing from tilting relative to each other, and a second means for driving the holder to oscillate around the shaft, thereby oscillating the mirror during a scanning operation. Preferably, the first means is adapted to generate a lateral retaining force sufficient to constantly keep the shaft and the bearing in an aligned contact with each other. Since the relative tilting between bearing and the shaft is prevented, the wobble or vibration of bearing, and therefore of the holder and the mirror, relative to the shaft is therefore suppressed. This provides for a more accurate scanning operation.

In an embodiment, the first means comprises a magnet secured to the holder for generating the lateral retaining force magnetically between the magnet and the shaft, thereby keeping the shaft and the bearing in the constant aligned contact with each other.

In another embodiment, the first means comprises a magnet secured to the holder, and a generating unit external to the holder for generating the lateral retaining force magnetically between the generating unit and the magnet, thereby keeping the shaft in the constant aligned contact with the bearing surface.

In a further embodiment, the second means also comprises the magnet in the first means, and the magnet is further adapted to oscillate under an oscillating magnetic driving force, thereby bringing the holder and the mirror to oscillate around the shaft.

Alternatively, the second means comprises a magnet that is separate from the magnet in the first means.

Preferably, the oscillating magnetic driving force is generated by a coil having an alternating current passing therethrough.

Preferably, the bearing, or at least the bearing surface, is made of a material having a low friction with the shaft. Preferably, the bearing is made of Polyethylene, while the shaft is made of a stainless steel.

Preferably, the Polyethylene bearing surface is surrounded by a material that is easier to mold, so that the shape can be better formed. Also, the surrounding material should adhere well to the surface of the oscillating mirror, for better mounting. Also, the material can be chosen such that it is inexpensive to manufacture into the appropriate form for the product, and inexpensive to acquire.

BRIEF EXPLANATION OF THE DRAWINGS

The above and other features and advantages will be clearer after reading the detailed description of the preferred embodiments of the present invention with reference to the accompanying drawings, in which:

FIG. 1b is a partial sectional view illustrating a tilt between the shaft and the bearing in the assembly of FIG. 1a;

FIG. 2b is a partial sectional view illustrating an aligned contact between the shaft and the bearing in the assembly of FIG. 2a;

FIG. 3a is a top view schematically illustrating another embodiment of the oscillation scan mirror assembly according to the present invention; and FIG. 3b is a partial sectional view illustrating an aligned contact between the shaft and the bearing in the assembly of FIG. 3a.

DETAILED DESCRIPTION OF PREFERRED EMBODIMENTS

Figure 1B:
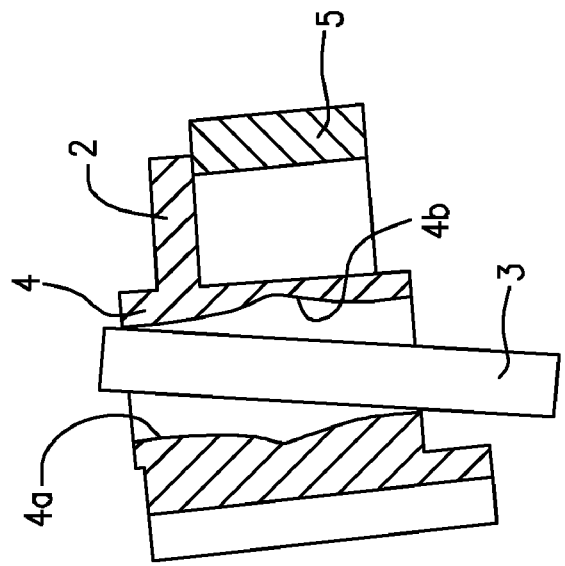
Figure 1A:
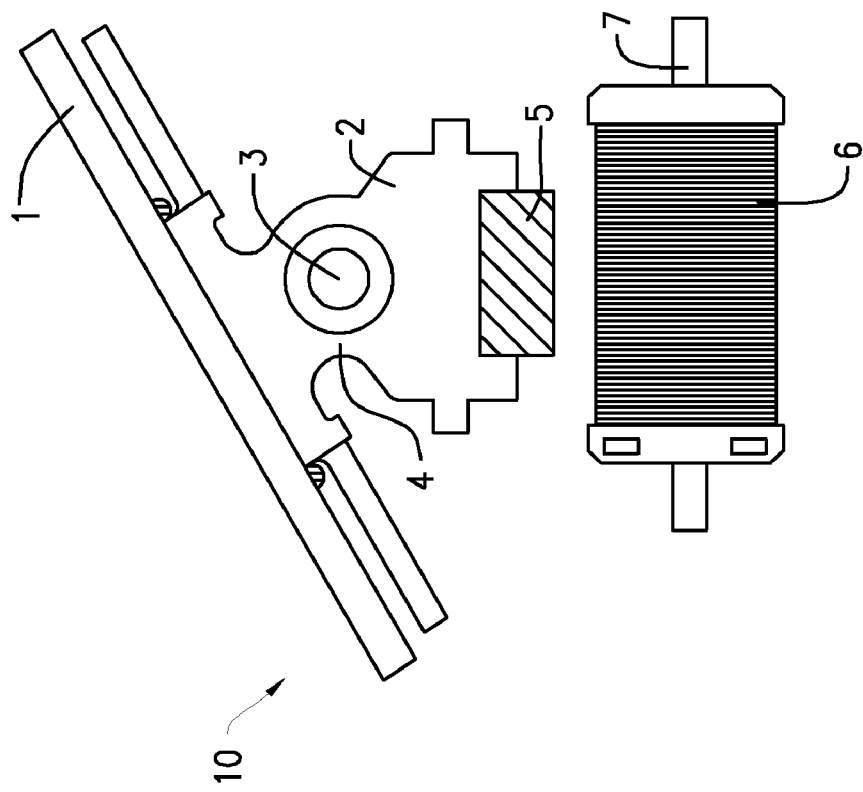
FIG. 1a is a top view schematically illustrating an oscillation scan mirror assembly in the prior art.
Figure 2A:
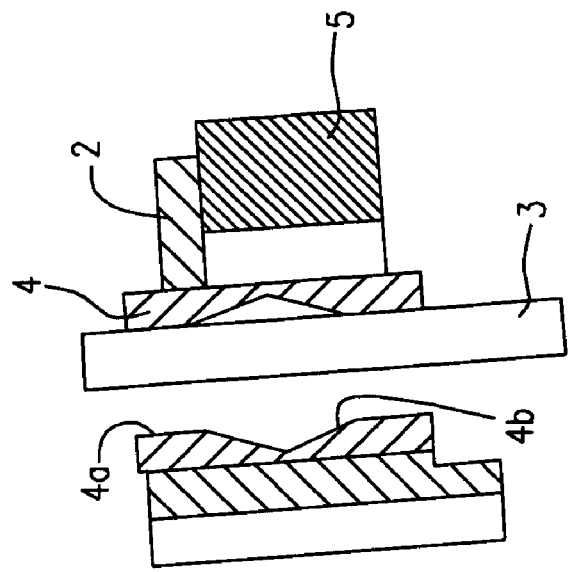
FIG. 2a is a top view schematically illustrating an embodiment of the oscillation scan mirror assembly according to the present invention.

FIG. 2a illustrates an embodiment of the oscillation scan assembly 10 according to the present invention. Similar to the oscillation scan mirror assembly of the prior art as illustrated in FIG. 1a, the scan mirror assembly 10 shown in FIG. 2a also comprises a mirror 1 mounted on a holder 2 that is supported on a vertically positioned stationary shaft 3 through a bearing 4. A magnet 5 is embedded in the holder 2. In a scanning operation, the magnet 5 oscillates under an oscillation magnetic driving force generated by an alternating current passing through a coil 6 wound on a yoke 7, thereby bringing the holder 2 and the mirror 1 to oscillate around the shaft 3.

According to the teaching of the present invention, a lateral retaining force is provided to prevent the bearing 4 and the shaft 3 from tilting relative to each other.

Figure 2B:
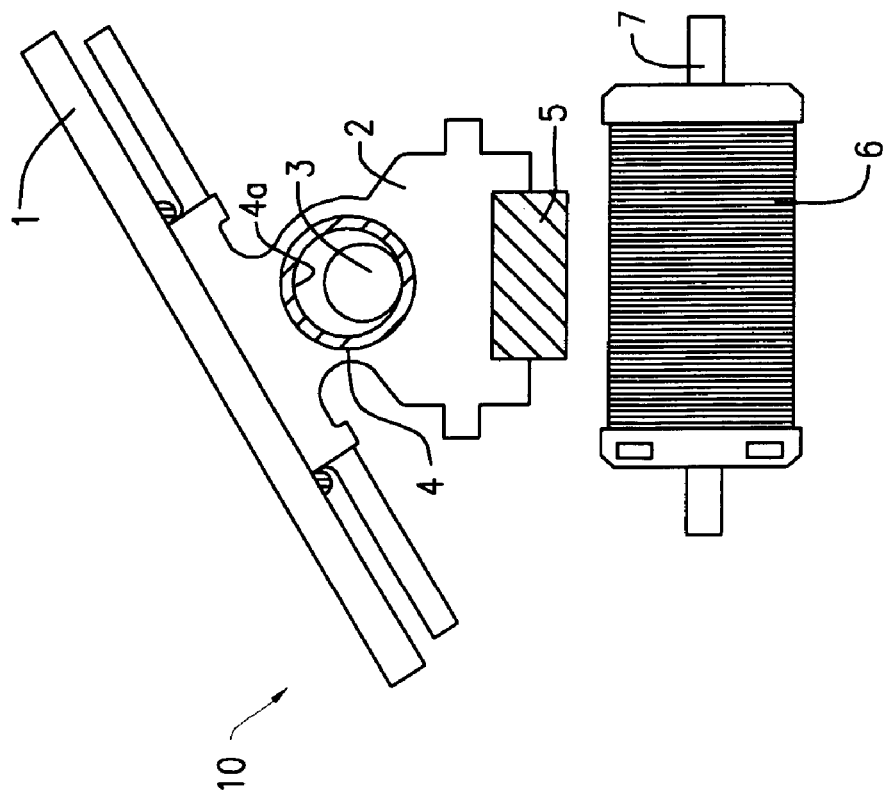

In the embodiment illustrated in FIG. 2a, the shaft 3 is made of a magnetic material such as a magnetic stainless steel, and the lateral retaining force is an attractive magnet force generated between the magnet 5 and the shaft 3. According to the teaching of the present invention, the attractive magnetic force between the magnet 5 and the shaft 3 is large enough to constantly keep the shaft 3 and the bearing 4 in contact with each other, as illustrated in FIG. 2b, thereby preventing wobbling. In this embodiment, due to the attractive force between the magnet 5 and the shaft 3, the shaft 3 is in a constant aligned contact with a part of the bearing surface 4a that is close to the magnet 5.

Thus, the shaft 3 and the bearing 4 do not tilt relative to each other, thereby preventing undesirable wobble or vibration of the bearing 4 (and therefore of the holder 2 and the mirror 1) relative to the shaft 3. The wobbling is thus suppressed.

In the prior art as shown in FIG. 1a, the magnetic force between the magnet 5 and the shaft 3, if any, is not large enough to constantly keep the shaft 3 and the bearing 4 in an aligned contact with each other. In the embodiment of FIG. 2a according to the present invention, to generate and/or increase the magnetic force between the magnet 5 and the shaft 3, the shaft 3 is preferably made of a material with a high permeability. In addition, or alternatively, the shaft 3 and/or the magnet 5 are preferably larger than those in the prior art. At the very least, they have a larger magnetic force between them such that the magnet remains in full contact and wobbling is substantially eliminated.

Preferably, the magnet 5 is placed close to the bearing 4 (and therefore to the shaft 3) so as to increase the magnetic force.

Preferably the bearing 4, as illustrated in FIG. 2a, is made of a material with a low friction with the shaft 3, while the rest of the holder 2 may be made of other material or materials. In a preferred embodiment, the bearing 4 is made of Polyethylene, while the shaft 3 is made of a stainless steel. This construction is advantageous because the strong magnetic force causes the shaft 3 to be firmly pressed against the side of bearing surface 4a, and thus, it is preferable to have a very low coefficient of friction between the bearing surface 4a and the shaft 3.

In another embodiment, the lateral retaining force is formed between the magnet 5 mounted or embedded in the holder 2 and a generating unit external to the holder 2. As illustrated in FIG. 3a, the external generating unit comprises a coil 8 wound on a yoke 9, and a lateral attractive magnetic force between the magnet 5 and the external generating unit is generated by a constant current passing through the coil 8. Thus, the magnet 5 is attracted toward the external generating unit, i.e., the coil 8 and the yoke 9, thereby constantly keeping the bearing 4 and the shaft 3 in an aligned contact with each other, as best illustrated in FIG. 3b. In this embodiment, the shaft 3 is in a constant aligned contact with a portion of the bearing surface 4a that is distant to the magnet 5.

Preferably, similar to the embodiment in FIG. 2a, the magnet 5 also oscillates under an oscillating magnetic driving force, thereby bringing the holder 2 and the mirror 1 to oscillate around the shaft 3. The oscillating magnetic driving force may be generated by another generating unit external to the holder 2, such as the coil 6 on the yoke 7 as illustrated in FIG. 2a, or preferably generated by the same external generating unit that generates the lateral attractive force between the generating unit and the magnet 5. For example, the coil 6 for generating the oscillating magnetic driving force and the coil 8 for generating the lateral attractive magnetic force may be wound on the same yoke 7 or 9.

In addition to, or as an alternative to, the attractive magnetic force between the coil 8 and the magnet 5, another attractive magnetic force may be applied to the shaft 3 in a direction opposite to the attractive force between the coil 8 and the magnet 5. As illustrated in FIG. 3a, the shaft 3 may be made of a magnetic material such as a magnetic stainless steel, and another magnet 11 may be placed close to the bearing 4 at a location opposite to the magnet 5. The attractive magnetic force formed between the magnet 11 and the shaft 3 keeps or helps to keep the shaft 3 and the bearing 4 to be in the constant aligned contact with each other, as illustrated in FIG. 3b.

Though the above has described the preferred embodiment of the present invention, it shall be understood that numerous adaptations, modifications and variations are possible to those skilled in the art without departing the gist of the present invention. For example, in the embodiment illustrated in FIG. 2a, a repelling magnetic force may be provided between an external generating unit (similar to that described in FIG. 3a) and the magnet 5, thereby keeping the shaft 3 in the constant contact with the portion of the bearing surface 4a that is close to the magnet 5. While in the embodiment illustrated in FIG. 3a, a repelling magnetic force may be provided between the magnet 5 and the shaft 3, thereby keeping or helping to keep the shaft 3 in the constant aligned contact with the portion of the bearing surface 4a distant to the magnet 5. Therefore, the scope of the present invention is solely intended to be defined by the accompanying claims.

What is claimed is:

1. An oscillation scan mirror assembly, comprising:
   a shaft;
   a holder having a bearing with a bearing surface for supporting the holder on said shaft;
   a scan mirror secured to said holder;
   first means providing a magnetic force acting between said holder and said shaft so as to prevent said shaft and said bearing from tilting relative to each other; and
   second means for driving said holder to oscillate around said shaft, thereby oscillating said mirror during a scanning operation.

2. The mirror assembly of claim 1, wherein said shaft is made of a magnetic material, said shaft and first means being constructed to cooperatively generate a retaining force sufficient to constantly keep said shaft in an aligned contact with said bearing surface of said bearing as said mirror oscillates.

3. The mirror assembly of claim 1, wherein said force is in a direction perpendicular to an axial direction of said shaft.

4. The mirror assembly of claim 2, wherein said first means comprises a first magnet secured to said holder for generating said force magnetically in cooperation with said shaft, between said first magnet and said shaft, said magnet and said shaft being relatively positioned and constructed so as to keep said shaft in said aligned contact with said bearing surface.

5. The mirror assembly of claim 4, wherein said second means comprises a second magnet secured to said holder, said second magnet being adapted to oscillate under an oscillating magnetic driving magnetic force, thereby bringing said holder and said mirror to oscillate around said shaft.

6. The mirror assembly of claim 5, wherein said second means further comprises a coil with an alternating current passing therethrough for generating said oscillating driving magnetic force.

7. The mirror assembly of claim 4, wherein said force is an attractive magnetic force.

8. The mirror assembly of claim 4, wherein said force is a repelling magnetic force.

9. The mirror assembly of claim 4, wherein said shaft is made of a material of high permeability.

10. The mirror assembly of claim 3, wherein said first means comprises a first magnet secured to said holder and a first generating unit external to said holder for generating said force magnetically between said generating unit and said first magnet, thereby keeping said shaft in said aligned contact with said bearing surface.

11. The mirror assembly of claim 10, wherein said first generating unit comprises a first coil with a constant current passing therethrough and oriented to generate said force.

12. The mirror assembly of claim 11, wherein said second means comprises a second generating unit external to said holder for generating an oscillating magnetic driving force to drive said first magnet to oscillate, thereby driving said first magnet and therefore said holder and said mirror to oscillate around said shaft.

13. The mirror assembly of claim 12, wherein said second generating unit comprises a second coil with an alternating current passing therethrough and oriented to generate said oscillating magnetic driving force.

14. The mirror assembly of claim 12, wherein said first and second coils are wound on a common yoke.

15. The mirror assembly of claim 10, wherein said shaft is made of a material of no or low permeability.

16. The mirror assembly of claim 1, wherein said bearing is made of a material having a low friction with said shaft.

17. The mirror assembly of claim 16, wherein said material is Polyethylene.

18. An oscillation scan mirror assembly, comprising a scan mirror secured to a holder which is rotatably mounted on a stationary shaft under an oscillating driving force, and further comprising first means providing a magnetic force between said shaft and said holder sufficient to prevent relative wobbling movement between said shaft and a bearing surface supporting said holder on said shaft.

19. The mirror assembly of claim 18, wherein said means comprises a magnet secured to said holder and oriented for generating a lateral force between said magnet and an axis of said shaft sufficient to constantly keep said shaft and said bearing surface in an aligned contact with each other.

20. The mirror assembly of claim 18, further comprising second means constructed and oriented to generate said oscillating driving force magnetically, thereby driving said magnet and therefore said holder and said mirror to oscillate around said shaft.

21. The mirror assembly of claim 20, wherein said means generating said oscillating driving force is a coil with an alternating current passing therethrough.

22. The mirror assembly of claim 18, wherein said means comprises a magnet secured to said holder and a first generating unit external to said holder generating a lateral retaining force magnetically between said generating unit and said magnet, said retaining force being sufficient to constantly keep said shaft in an aligned contact with said bearing surface.

23. The mirror assembly of claim 22, further comprising a second generating unit external to said holder constructed and oriented for generating said oscillating driving force applied to said magnet, thereby driving said magnet and therefore said holder and said mirror to oscillate around said shaft.

24. An oscillation scan mirror assembly comprising:
   a shaft;
   a scan mirror;
   a holder for securing said scan mirror thereon, said holder having a bearing rotatably mounted on said shaft;
   wherein said bearing is made of a material having a low friction with said shaft, while the rest of said holder is not made of said material; and
   means providing a magnetic retaining force between said holder and said shaft sufficient for preventing said shaft and said bearing from tilting relative to each other.

25. The mirror assembly of claim 24, wherein said means comprises a magnet secured to said holder positioned and oriented for generating a lateral retaining force between said magnet and said shaft sufficient to constantly keep said shaft in an aligned contact with a bearing surface of said bearing.

26. The mirror assembly of claim 25, further comprising a generator of an oscillating magnetic field oriented to cause said magnet to oscillate about said shaft under an oscillating magnetic driving force, thereby bringing said holder and said mirror to oscillate around said shaft.

27. The mirror assembly of claim 24, wherein said means comprises a magnet secured to said holder, and a generating unit external to said holder for generating a lateral retaining force magnetically between said generating unit and said magnet, said retaining force being oriented and being sufficient to constantly keep said shaft in an aligned contact with a bearing surface of said bearing.

28. The mirror assembly of claim 27, further comprising a generator of an oscillating magnetic field oriented to cause said magnet oscillate about said shaft under an oscillating driving force applied thereon, thereby bringing said holder and said mirror to oscillate around said shaft.

29. The mirror assembly of claim 28, wherein said oscillating driving force is also generated by said generating unit.

30. An oscillation scan mirror assembly, comprising:
   a shaft;
   a holder rotatably supported on said shaft through a bearing surface of a bearing;
   a scan mirror secured to said holder; and
   means magnetically generating a force between said shaft and said holder oriented to and sufficient for preventing said bearing of said holder from tilting relative to said shaft.

31. The mirror assembly of claim 30, wherein said means comprises a magnet secured to said holder, said shaft being made of a magnetic material and said magnet and said shaft being constructed for cooperatively generating a magnetic retaining force between said magnet and said shaft sufficient to constantly keep said shaft in an aligned contact with said bearing surface.

32. The mirror assembly of claim 30, wherein said means comprises a magnet secured to said holder and a magnetic field generator, external of said holder, producing in cooperation with said magnet a lateral magnetic retaining force sufficient to constantly keep said shaft in an aligned contact with said bearing surface.

33. The mirror assembly of claim 32, wherein said magnet is further constructed and oriented to produce in response to an oscillating magnetic field, from external of said holder, an oscillating magnetic driving force about an axis of said shaft, thereby oscillating, together with said holder and said mirror, around said shaft.

34. The mirror assembly of claim 30, wherein said bearing surface is made of a material having a low friction with said shaft.

35. The mirror assembly of claim 34, wherein said material is Polyethylene, while said shaft is made of a stainless steel.

* * * * *